United States Patent [19]

Grütte et al.

[11] Patent Number: 4,692,340

[45] Date of Patent: Sep. 8, 1987

[54] PROCEDURE FOR THE PRODUCTION OF A GRANULATED INFANT MILK FOOD PRODUCT

[75] Inventors: Friedrich-Karl Grütte, Caputh; Heinrich Petzold, Bergholz-Rehbrücke; Ulrich Walter, Potsdam-Bornstedt; Gunhild Bogs; Joachim Domeratzky, both of Halle; Helmut Gärtner, Kleinmachnow; Jürgen Schulze, Bergholz-Rehbrücke; Hans-Joachim Zunft, Kleinmachnow; Otto Pulz, Potsdam-Babelsberg; Christa Luft, Potsdam; Walheide Müller, Potsdam-Wildpark; Petra Wölk; Hannelore Dahlke, both of Potsdam; Margret Volkmer, Potsdam-Babelsberg, all of German Democratic Rep.

[73] Assignee: Institut für Getreideverarbeitung im VEB Kombinat Nahrungsmittel und Kaffee, Bergholz-Rehbrucke, German Democratic Rep.

[21] Appl. No.: 785,023

[22] Filed: Oct. 4, 1985

Related U.S. Application Data

[63] Continuation of Ser. No. 496,707, May 20, 1983, abandoned.

[30] Foreign Application Priority Data

Dec. 2, 1982 [DD] German Democratic Rep. ... 245460

[51] Int. Cl.$^4$ .................... A23C 11/00; A23C 9/00; A23C 21/06

[52] U.S. Cl. .......................... 426/72; 426/74; 426/99; 426/103; 426/302; 426/588; 426/657; 426/467; 426/801

[58] Field of Search ............... 426/96, 98, 99, 302, 426/103, 801, 467, 453, 285, 72, 74, 580, 588, 590, 657, 471

[56] References Cited

U.S. PATENT DOCUMENTS

| | | | |
|---|---|---|---|
| 3,035,918 | 5/1962 | Sorgenti et al. | 426/467 |
| 3,359,119 | 12/1967 | Milton | 426/285 |
| 3,391,003 | 7/1968 | Armstrong et al. | 426/285 |
| 3,627,583 | 12/1971 | Troy et al. | 426/285 |
| 3,809,758 | 5/1974 | Mathias et al. | 426/285 |
| 3,956,521 | 5/1976 | Pisecky et al. | 426/467 |
| 4,216,236 | 8/1986 | Müller et al. | 426/801 |

Primary Examiner—Raymond N. Jones
Assistant Examiner—Marianne M. Cintins
Attorney, Agent, or Firm—Jordan and Hamburg

[57] ABSTRACT

A procedure for the production of granulated food, applicable especially to the production of granulated baby and infant food, such as infant food most analogously resembling mother's milk is disclosed. The process provides a new composition of matter consisting of a stable, well dosable, granulated food product, of defined formula, which after reconstitution does not cream up, and which, in the case of the closest approach to the composition of mother's milk, will inhibit intestinal putrefaction. In the process, selected pulverized components are fed into a fluidized bed granulator and remaining fluidized components are sprayed simultaneously, successively or in mixtures, at a product temperature of 30° to 80° C. whereby granulates are obtained. The granulates are dried in the fluidized bed and cooled with air.

10 Claims, No Drawings

PROCEDURE FOR THE PRODUCTION OF A GRANULATED INFANT MILK FOOD PRODUCT

This application is a continuation of application Ser. No. 496,707, filed May 20, 1983 now abandoned.

BACKGROUND OF THE INVENTION AND PRIOR ART STATEMENT

The invention relates to a procedure for the production of granulated baby and infant food, such as infant food most analogously resembling mother's milk, adapted initial and sequel food, baby and infant pap with fruit and/or vegetables, s well as reduction and constitution food for convalescents on the basis of milk, milk products or other animal or vegetable proteins, vegetable and/or animal fats, carbohydrates, minerals, and vitamins. The foods are prepared ready by stirring in hot or cold water.

According to the prior art, baby and infant food, reduction and constitution food for convalescents are prepared by dry mixing the components or by wet mixing the components, homogenizing, possibly pasteurizing and spray drying.

The disadvantage of the known procedures of dry mixing is the demand for pulverized raw materials, i.e. they have to be subjected to energy-expensive vacuum, freeze, drum, or spary drying. This especially holds true to isolated and treated milk products, such as caseinate, fruit and vegetable products.

In the final preparation, these products poorly disperse in water. During handling the risk of disintegration is given because of the different specific weight of the components. Spray drying requires dissolving all the components, i.e. pulverized or cristalline components (semolina, sugar) have to be dissolved additionally which means a significant additional expenditure of energy. The high temperature of the drying air causes flavour losses in fruit and vegetable products. In milk products combined with reducing sugars the proteins may be damaged.

A great number of procedures is known, e.g. U.S. Pat. No. 3,320,072, for the production of infant food most analogously resembling mother's milk, the so-called simulated mother's milk; they aim at approximating the composition of mother's milk by selecting, mixing and processing appropriate components.

In the patent specifications, the effect of mother's milk is explained by different factors. U.S. Pat. No. 3,320,072 relates to a procedure which aims at reducing the relatively high phosphate and calcium content of cow's milk, whey, and defatted milk. Electrodialysis of whey and defatted milk is realized by complicated and expensive techniques. CH Pat. No. 398 281 relates to a procedure for the production of a pulverized infant milk by processing cow's milk with the addition of a nitrogenous substance, iron compounds, and vitamins. The patent specification is based upon the face that for achieving the equivalency of mother's milk not only the absolute amounts of lactose, fat, nitrogenous compounds, and ash components in the products are of decisive importance, but also the distribution of the nitrogenous compounds to casein, serum proteins, and non-protein nitrogenous compounds, as well as especially the relative proportion between lactose and serum proteins, between lactose and ash components, and between lactose and fat.

It is known by experience that mother's milk has a distinct microecological effect in the infant intestinum, which is expressed in typical level ranges of parameters, such as putrefaction flora, oxidation reduction potential, pH, ammonia content, buffer capacity of faeces. These phenomena are attributed to the fact that an acid pH of faeces implies the microbial metabolism of a carbohydrate passing the ileocecal valve. This holds true only to the lactose of the mother's milk, which penetrates to the distale intestine segments because it partly escapes the resorption in the small intestine. The resorption rate depends on the rate of enzymatic dissociation of lactose. As beta-lactose is dissociated more slowly than alpha-lactose, the rate of lactose dissociation is influenced by the rate of the transformation of beta-lactose to alphalactose. This mutarotation is influenced by factors which are contained in mother's milk in smaller quantities than in cow's milk (phosphate, citrate, free amino acids, etc.), so that the dissociation of the lactose of mother's milk is retarded compared with the lactose of cow's milk.

Out of the numerous experiments to develop food products of aseptic effect analogous to mother's milk in the above described sense, only the procedures described in the economic patents DD Pat. No. 83 295 and DD Pat. No. 104 707 are a successful approach.

According to DD 83 295, an infant food most analogously resembling mother's milk, is produced by spraying vegetable oil to spray-dried while milk powder, in a conventional mixer, and subsequent mixing with beta-lactose.

According to DD Pat. No. 104 707, a simulated mother's milk is produced by adding milk protein precipitated in the isoelectric point to anion free cow's milk whey, subsequent mixing with vegetable oils, vitamins and minerals, and spray drying. The powder is mixed with pulverized lactose and wheat starch. DE Pat. No. 2818 645 and U.S. Pat. No. 4,216,236 relate to formulas and procedures for the production of infant food, especially for premature babies, wherein a certain content of main nutrients, essential components and trace components of milk component parts, vegetable and animal fats is set and the mixture subsequently is homogenized, pasteurized and spray-dried. The powder is subjected to dry mixing with glucose. The disadvantage of the known procedures consists in the high technical and technological expenditures to obtain fine, well soluble powders.

The screening and steaming agglomeration according to the prior art to improve solubility and dosing accuracy, causes a slight destruction of the agglomerates because of their low stability. During pneumatic handling and packing a high amount of powder (abrasion loss) is resulting. Infant food produced according to this procedure and characterized by a high fat content (more than 20%) of the dry matter becomes inhomogeneous after reconstitution to bottle food.

DE Pat. No. 2508 192 relates to a procedure for the production of a dry food powder, wherein a dry potato product is sprayed with different protein, carbohydrate and fat containing aqueous mixtures and dried, in a three-chamber fluidized bed. The disadvantage of this procedure is the impossibility of a strict adherence to the formula, especially of the vitamin content, which is a must in the production of infant food. The specific weight of the solid particles will be reduced after spraying with a solution or emulsion and drying, thus they will be carried from one chamber over the wall into the next chamber. If a certain portion of components is not or too late discharged from the chamber and subjected to spraying during the stay in the chamber, the composition of the product is changed and the formula has to be prohibited.

SUMMARY OF THE INVENTION

It is an object of the invention to produce granulated baby or infant food, such as infant food most analogously resembling mother's milk, adapted initial and sequel food, baby and infant pap with fruit and/or vegetables, as well as reduction and constitution food for convalescents on the basis of milk, milk products or other animal or vegetable proteins, vegetable and/or animal fats, carbohydrates, minerals, and vitamins.

A principal object of the invention is the production at low technical and technological expenditures of a stable, well dosable, granulated food of defined formula which after reconstitution does not cream up, which in the cse of equivalency to mother's milk will inhibit intestinal putrefaction and which is applicable to all cases of an insufficient or disturbed detoxification function of the macroorganism, preferably of babies. The reduction of the technical and technological expenditures mainly is aimed at the reduction of the energy consumption compared with the comventional procedures of spray, vacuum, drum, and freeze drying.

These and other objects and advantages of the present invention will become evident from the description which follows.

This invention is concerned with the definition of process conditions for the production of various granulated food products, by mixing and drying in such a way that at a reduced energy consumption, compared with the traditional procedures, a stable product of instant character is obtained which after reconstitution does not separate into the fat component and other components. Mixing and drying have to be performed in such a way that during the production of an infant food most analogously resembling mother's milk, the risk of a technologically caused reduction of the biological value of the proteins is diminished.

It is within the realm of the invention, that in a fluidized bed granulator or a special mixer, vegetable or animal fats or fat emulsions or protein fat emulsions or carbohydrate solutions are sprayed individually and simultaneously, or successively or in mixtures or combinations to pulverized milk products, such as whole milk powder, defatted milk powder, lactose, whey proteins or caseinates, carbohydrates, or mixtures which predominantly consist of carbohydrates, such as modified starch, maize starch, rusk or biscuit rusk flour. The fluidized bed granulator is understood to be a unit in which pulverized components are kept in motion by an air current, heated, mixed, and simultaneously sprayed with a granulating medium. According to the invention, spraying is performed at a definite temperature of 30° to 80° C. The temperature of the drying and fluidizing air amounts to 40° to 120° C. The pulverized raw material is coated and agglomerated by the sprayed emulsion and solutions and dried simultaneously, in the fluidized bed. The moisture content of the protein fat emulsion should amount to 20 to 70%, of the soluble carbohydrate to 15 to 75%.

The invention has the special advantage that mixing, agglomeration, and drying is performed carefully in one operation. Simultaneous drying and granulating by spraying liquid components guarantee for a uniform distribution of the raw material, even of different particle size and specific weight, and of all the minor components.

Another advantage of the invention is the fact that by the selection of specific process parameters for the production of different foods a strict adherence to the formula is guaranteed, any damage of the specific components and any flavour losses are excluded.

In the production of an infant food most analogously resembling mother's milk, by the use of a pasteurized emulsion of proteins, preferably caseinate, animal and vegetable fats as granulating medium, a product is resulting which after reconstitution does not cream up, forms a stable milk, and inhibits intestinal putrefaction. Lactose or lactose mixed with other components is used as pulverized raw material, whereby the lactose content has to amount to a minimum of 40 g/100 g granulate.

Caseinate is prepared by acid precipitation from milk and separation or by drying and fine milling separately or together with the fat fraction, by alkaline adjusting pH to 7 at elevated temperatures. according to a modification of the invention, after acid precipitation from milk, separation and drying, the phosphate and calcium poor casein powder is ground and given into an aqueous alkali solution of a temperature of 60° to 70° C., preferably of 65° C., where during the development of caseinate a pH of 7.0 is obtained. According to a further modification of the invention, after acid precipitation from milk and separation, the casein is heated to max. 50° C., again separated and given into an aqueous alkali solution of a temperature of 60° to 70° C., preferably of 65° C., where during the development of caseinate a pH of 7.0 is obtained. Further, the development of caseinate is feasible by the aid of calcium hydroxide of a mixture of alkali hydroxide and calcium hydroxide at a ratio of 1:2 to 2:1.

According to further modifications, after the development of caseinate and the admixture of further components, such as proteins, carbohydrates, vitamins, and minerals, a smeltable fat phase of one or more fat components is sprayed into the powder, or casein powder or casein mass and a fat phase are given into an aqueous alkali solution of a temperature of 30° to 50° C., preferably of 35° C.

In the combined use of acid precipitated csein and milk powder the content of milk powder casein may not exceed 6.4 g/100 g granulate.

A further significant advantage of the invention is the way of mixing and drying, facilitating an addition of the free substances, which are causing the closest approach to mother's milk, either to the initial material or to an intermediate product, e.g. the protein fat emulsion, or directly to the final product, without causing a coagulation of the proteins. The mineral substances have to be chosen in such a way that the final product has a calcium content of 240 to 500 mg/100 g and a phosphate content of 360 to 1200 mg/100 g. For this purpose, either an insoluble calcium salt, preferably calcium carbonate, or soluble calcium slts, such as calcium chloride, calcium bromide, calcium acetate, calcium lactate, and calcium hydrogen carbonate, which are mixed withsoluble anions, such as oxalate, carbonate, fluoride, hydrogen phosphate, phosphate, sulfate, and citrate, are brout to reaction in an aqueous solution, whereby an insoluble amorphous precipitate is formed which does not affect the protein and does not settle.

A further advantage of the invention is the selection of the anions which guarantees that the concentration of the dissociated calcium ions does not exceed $10^{-2}$ mol/l and the concentration of phosphate does not exceed a value desirable for the closest approach of the food to mother's milk, in the reconstituted food. A calcium concnetration smaller than $10^{-2}$ mol/l in the reconstituted food prevents a coagulation of the proteins, especially a precipitating effect upon the alpha-casein. A phosphate overmineralization may be prevented by corresponding anion mixing. A phosphate content higher than 60 mg/100 ml reconstituted food will nullify the desired microecological effect.

The granulate which is the product of mixing all the components, may be hardened and its keeping quality improved (fat deterioration is prevented) by spraying a carbohydrate solution. The keeping quality and solubility of the final product may be improved also by spraying an antioxidant or an emulsifier which should have a HLB-value of 8 to 18. The granulate is dried to a final moisture content of 0.5 to 5%.

A further advantage of the invention is the fact that for the production of infant pap with fruit and/or vegetables these additives may be sprayed to the fluidizing pulverized raw material, or to the final product in the form of pulp, squash and juice. Thus the expensive processes of vacuum, freeze or spray drying of the added fruit and/or vegetables may be eliminated.

DETAILED DESCRIPTION OF THE PREFERRED EMBODIMENTS

The present invention is thus generally characterized by the provision of a method for the production of a granulated (infant) food product, analogous to mother's milk, for reconstitution with water, basically entailing the steps of passing a first feed stream containing lactose and/or other carbohydrates into a fluidized bed, wherein said first feed stream is kept in suspension; providing additional components required for the total composition, said additional components including a stable caseinate and fat emulsion, together with a portion of carbohydrates, vitamins and minerals; spraying said additional components in liquified or dissolved form into said fluidized bed as a second feed stream, said stable caseinate and fat emulsion having maximal fat droplet size of $10\mu$ and a moisture content of 20% to 70%; the protein utilized in said second feed stream being acid-precipitated low-calcium and low-phosphate casein; thereby producing a granulated infant food product in said fluidized bed; and recovering a product granulated infant food product from said fluidized bed; the total content of calcium and phosphate being brought to a calcium value of 240 mg to 500 gm per 100 g granulate, and a phosphate value of 360 to 1200 mg per 100 g granulate, by means of added minerals; whereby soluble and insoluble calcium salts are combined with anions, which form insoluble calcium salts, and in which the calcium concentration of said granulate does not exceed $10^{-2}$ Mol/l in the reconstituted food.

Considered as a new composition of matter, the present product typically consists of a granulated infant food product analogous to mother's milk, for reconstitution with water, and produced according to the fluidized bed technique, whereby the protein consists of acid-precipitated calcium and low-phosphate casein of a total calcium content of 240 to 500 mg/100 g granulate and a total phosphate content of 360 to 1200 mg/100 g granulate, whereby for the calcium a concentration of $10^{-2}$ Mol/l calcium ions, and a phosphate content of 60 mg/l of reconstituted infant food are not exceeded. With regard to the product constituents, the granulated infant food product of the present invention is one in which the finished product has the following composition per 100 parts of weight:

protein about 10.8 parts of weight,
fat about 24.6 parts of weight,
carbohydrates about 58.9 parts of weight,
water about 9.8 parts of weight,
minerals and
vitamins about 1.9 parts of weight,
wherein
calcium content is 0.24 to 0.500 parts of weight, and
phosphate content is 0.36 to 1.200 parts of weight.

Following are examples of preferred embodiments, with special emphasis on the methods of preparation of the present composition of matter consisting of a granulated (infant) food product.

EXAMPLE 1

100 kg granulate most analogously resembling mother's milk, of the following ross composition, proteins: 10.8 kg
fat: 24.6 kg
carbohydrates: 58.9 kg
minerals and vitamins: 1.9 kg
of it: calcium: 0.3 kg
phosphate: 0.4 kg
water 3.8 kg are prepared as follows. 54.5 kg lactose (moisture content 7.3%, including 6.9% water of cristallization) are given into a fluidized bed granulator and during agitation heated to 60° C. 62.7 kg of a mixture of caseinate, fat, vitamins, and minerals, heated to 65° C., are added. Caseinate is prepared by mixing 13.2 kg casein powder, which was acid precipitated and separated from cow's milk and dried (81.6% proteins, 9.7% moisture content, milled to a particle size 100% smaller than 0.4 mm), with 23.4 kg water of 65° C., which contains 0.39 kg NaOH or 0.56 kg KOH or 0.79 kg $K_2CO_3$ or 0.70 kg $Ca(OH)_2$ or a mixture thereof, and by stirring till a pH 7.0 is obtained, in order to avoid particle agglomeration. The fat used is a mixture of 14.5 kg clarified butter, 4.9 kg sunflower seed oil, 4.9 kg lard, and 75.5 g fat-soluble vitamins.

The mixture of lactose, caseinate, fat, vitamins, and minerals is granulated and dried to a moisture content of 3.0% in the fluidized bed. For hardening the granulate, bringing it to a particle size of 0.5 to 2.0 mm and to a moisture content of 3.8%, 32 l of a 40% maltodextrins solution (mono- or disaccharides or soluble starches may be used, alternatively) of a temperature of 60° C. are sprayed to the granulate. The granulate is cooled to 20° C. and packed appropriately. For the final preparation, 130 g of the granulate are reconstituted with water to 1000 ml liquid food.

EXAMPLE 2

For the preparation of 100 kg granulate of the composition as described in example 1, 52.3 kg lactose (moisture content 7.3%, including 6.9% water of cristallization) and 8.5 kg ultrafiltrated whey protein powder (50.5% proteins, 25.6% lactose, 6.3% fat, 3.7% minerals, 13.9% moisture content) are fed into a fluidized bed granulator and during agitation heated to 60° C. 7.9 kg casein powder (acid precipitated from cow's milk, separated, dried, milled to a particle size 100% smaller than 0.4 mm, of a protein content of 81.6%, moisture content of 9.7%) are stirred carefully with 14.0 kg water of a temperature of 65° C., which contains 0.24 kg NaOH or 0.33 kg KOH or 0.42 kg $K_2CO_3$ or 0.47 kg $Ca(OH)_2$ or a mixture thereof, till a pH 7.0 is obtained and any particle agglomeration is prevented, with an addition of 1.5 kg mineral substances, vitamin mixture and fat, consisting of 14.1 kg clarified butter, 4.9 kg sunflower seed oil, 4.9 kg lard, and 75.5 g fat soluble vitamins.

47.3 kg of the mixture of caseinate, fat and vitamins are sprayed to the mixture of lactose and whey protein powder in the fluidized bed granulator, whereby a granulate of a moisture content of 3% is obtained. The granulate subsequently is sprayed with 20 l of a 40% carbohydrate solution of a temperature of 60° C., e.g. maltodextrins. The resulting granulate has a particle size of 0.5 to 2.0 mm and a moisture content of 3.8%. The product is cooled to approx. 20° C. and packed. For the final preparation, 130 g of the granulate are reconstituted with water to 1000 ml liquid food.

EXAMPLE 3

100 kg powder of the gross composition,
  proteins: 10.8 kg
  fat: 24.6 kg
  carbohydrates: 58.9 kg
  minerals and vitamins: 1.9 kg
  of it: calcium: 0.3 kg
    phosphate: 0.4 kg
  water: 3.8 kg
are prepared as follows. 24 kg casein (moisture content 75%) are acid precipitated and separated from cow's milk, heated to 50° C. and again separated and thus concentrated to 12 kg casein (moisture content 50%), which is given into 2.17 kg of a 15% aqueous calcium hydroxide solution of a temperature of 65° C. and stirred until a pH 7.0 is obtained. The resulting caseinate is mixed under stirring with 0.7 kg of a mineral mixture and a vitamin mixture, 44.9 kg lactose (moisture content 7.3%, including 6.9% water of cristallization), 8.0 kg maltodextrins (moisture content 3.6%), and 20.7 kg whole milk powder (26.0% proteins, 38.0% lactose, 25.0% fat, 5.5% minerals, moisture content 5.5%, including 2.8% water of cristallization of lactose).

A melt, consisting of 9.2 kg clarified butter, 4.9 kg sunflower seed oil, 4.9 kg lard, 14.0 g vitamin A, 55 g vitamin B, and 3.5 kg of a saturated aqueous lactose solution (28%=1 kg lactose), heated to 60° C., is sprayed to the mixture. The powder is cooled to 30° C., passed through a sieve with agglomeration, dried in an air current of 30° C. from a moisture content of 11% down to 3.8%, cooled in an air cooler, classified in a siftern to a particle size of 0.5 to 1.5 mm, and packed. For the final preparation, 130 g of the powder are reconstituted with water to 1000 ml liquid food.

EXAMPLE 4

Preparation of an apple-milk pap. 100 kg of a granulated infant apple-milk pap are prepared, if
  20 kg whole milk powder
  15 kg instant rice flour
  6 kg instant semolina
  10 kg ground biscuit rusks
  21 kg sugar and specific minerals and vitamins
are mixed, granulated and dried in a fluidized bed granulator with simultaneous spraying the granulating medium. 5 kg vegetable oils and, as second operation, 60 kg apple pulp (25% dry matter) are used as granulating medium. During granulation and drying the product has a temperature of 40° C. The moisture content of the granulate is brought to 5%. 50 g of the granulate and 150 g water are prepared to a ready-to-eat pap.

EXAMPLE 5

Preparation of an infant sequel food. 100 kg of a granulated infant sequel food are prepared, if
  40 kg spray-dried whole milk powder
  13 kg maize starch
  9 kg sugar
  11 kg lactose and specific vitamins and minerals
are mixed and granulated in a fluidized bed granulator with simultaneous addition of the granulating medium. 11 kg vegetable oil is used as granulating medium. To improve the keeping quality of the final product, 5 kg of the sugar may be sprayed additionally in form of a 50% aqueous solution, thus producing a sugar film around the fat and preventing autoxidative losses.

140 g of the granulate are mixed with 100 ml water to a ready food for babies from the 3rd month of life (composition of dry matter: 13.4% proteins, 23.8% fat, 59.5% carbohydrates).

In summary, the present invention relates to a procedure for the production of granulated food, applicable especially to the production of granulated baby and infant food, such as infant food most analogously resembling mother's milk, adapted initial and sequel food, infant pap with fruit and/or vegetables, as well as reduction and constitution food for convlescents on the basis of milk, milk products or other animal or vegetable proteins, fats, carbohydrates, minerals, and vitamins. It is the aim of the invention to produce and provide at low technical and technological expenditures a new composion of matter consisting of a stable, well dosable, granulated food product, of defined formula, which after reconstitution does not cream up, and which, in the case of the closest approach to the composition of mother's milk, will inhibit intestinal putrefaction. It is within the realm of the invention that selected pulverized components are fed into a fluidized bed granulator, or a special mixer, and the remaining fluidized components are sprayed simultaneously, successively or in mixtures or combinations, at a product temperature of 30° to 80° C.

The temperature of the drying air in the fluidized bed granulator, or in the fluidized bed attached to the mixer, amounts to 40° to 120° C. The granulates are dried in the fluidized bed, and cooled with air.

It thus will be seen that there is provided a method for the production of granulated food, and a granulated food product composition of matter, which attain the various objects of the invention, and which are well adapted for the conditions of practical use. As numerous alternatives within the scope of the present invention will occur to those skilled in the art, besides those alternatives, equivalents, variations, and modifications mentioned supra, it will be understood that the present invention extends fully to all such alternatives and the like, and is to be limited only by the scope of the appended claims, and functional and structural equivalents thereof.--

We claim:

1. A method for the production of a granulate for infant food, for reconstitution with water to form a liquid analogous to mother's milk, said granulate having a moisture content of 0.5 to 5%, comprising feeding lactose or lactose and whey protein powder into a fluidized bed granulator and spraying a caseinate-fat emulsion containing vitamins and minerals onto the lactose or lactose and whey protein powder in the granulator, the caseinate-fat having a fat particle maximum size of 10μ and a moisture content of 20 to 70%, and the caseinate being of a casein acid-precipitated from cow's milk which is lower in calcium and phosphate content than bound calcium and phosphate in casein in cow's milk, the minerals containing at least one water soluble or water insoluble calcium salt and a water soluble source of anions and being added in such quantities that the total content of calcium is from 240 mg to 500 mg per 100 g granulate and the total content of phosphate is from 360 to 1200 mg per 100 g granulate, wherein the concentration of calcium ions is below $10^{-2}$ Mol/l and the phosphate content does not exceed 60 mg/ml when the granulate is reconstituted with water and the lactose is fed into the granulator in such a quantity that the lactose content of the granulate is at least 40g/100 g granulate and the granulate has a final moisture content of 0.5 to 5% and the total calcium and phosphate contents are each based on granulate having a moisture content of 0.5 to 5%.

2. Method according to claim 1, wherein the caseinate in the cseinate-fat emulsion is prepared by acid-precipitating, separating and drying casein from cow's milk to produce casein powder and mixing the casein powder with an aqueous alkaline solution in such proportions to neutralize said casein powder to form said caseinate.

3. Method according to claim 2, in which the alkaline solution contains calcium hydroxide and at least one alkali hydroxide in a weight proportion in the range of 1:2 to 2:1.

4. Method according to claim 3, in which the fat is a mixture of milk fat, vegetable fat and lard in a weight ratio of milk fat to vegetable fat to lard of 14.1:4.9:4.9.

5. Method according to claim 4, in which the milk fat is clarified butter and the vegetable fat is sunflower seed oil.

6. Method according to claim 3, in which the caseinate-fat emulsion is sprayed at a temperature of 30° to 80° C., air effecting the fluidization is at a temperature of 40° to 120° C., the moisture content of the caseinate-fat emulsion is 20 to 70% and the moisture content of the lactose or lactose and whey protein powder is 15 to 75%.

7. Method according to claim 4, in which the caseinate-fat emulsion is sprayed at a temperature of 30° to 80° C., air effecting the fluidization is at a temperature of 40° to 120° C., the moisture content of the caseinate-fat emulsion is 20 to 70% and the moisture content of the lactose or lactose and whey protein powder is 15 to 75%.

8. Method according to claim 5, in which the caseinate-fat emulsion is sprayed at a temperature of 30° to 80° C., air effecting the fluidization is at a temperature of 40° to 120° C., the moisture content of the caseinate-fat emulsion is 20 to 70% and the moisture content of the lactose or lactose and whey protein powder is 15 to 75%.

9. Method according to claim 8, in which the calcium salts are selected from the group consisting of calcium carbonate, calcium chloride, calcium bromide, calcium acetate, calcium lactate and calcium hydrogen carbonate and the anions are selected from the group consisting of oxalate, carbonate, fluoride, hydrogen phosphate, phosphate, sulfate and citrate.

10. A product produced by the method of claim 9.

* * * * *